Jan. 17, 1928.
H. ZEILENGA
1,656,551
PLATFORM FOR DISK HARROWS
Filed May 6, 1927    2 Sheets-Sheet 1
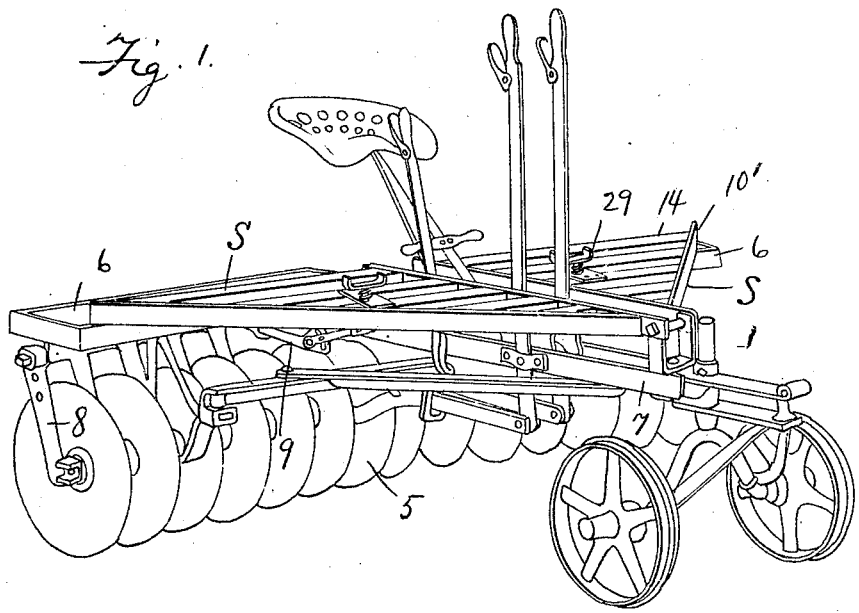
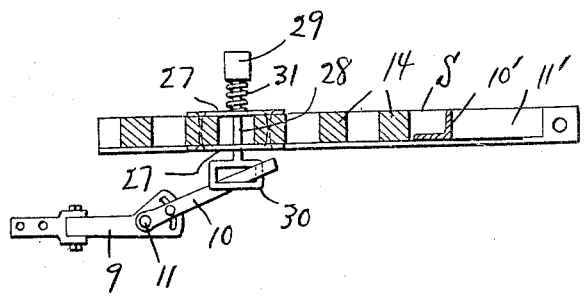
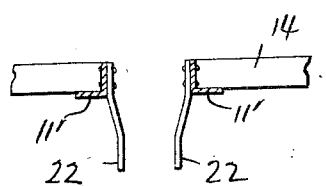
Inventor
Harry Zeilenga
By Clarence A. O'Brien
Attorney

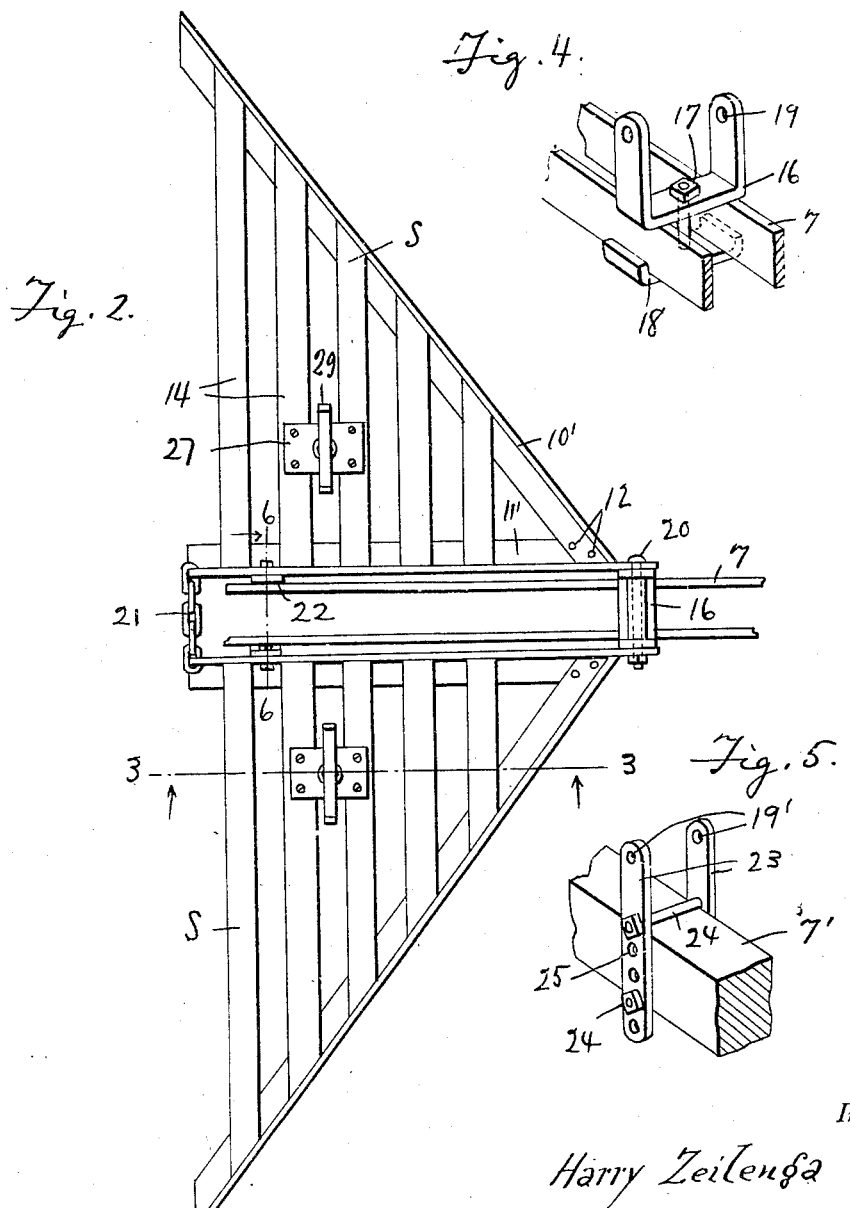

Patented Jan. 17, 1928.

1,656,551

UNITED STATES PATENT OFFICE.

HARRY ZEILENGA, OF HOMEWOOD, ILLINOIS.

PLATFORM FOR DISK HARROWS.

Application filed May 6, 1927. Serial No. 189,250.

The present invention relates to a platform for a disk harrow and has for its principal object to provide a structure which prevents the operator of the disk harrow getting his feet injured by the disks of the harrow in case he should slip or fall while on the seat or getting off or getting on said seat.

Another important object of the invention lies in the provision of a platform which may be readily attached to the disk harrow and through which the disk scrapers may be operated.

A still further very important object of the invention resides in the provision of a device of this nature which is simple in its construction, inexpensive to manufacture, strong and durable, thoroughly efficient and reliable in use, and otherwise well adapted to the purpose for which it is designed.

In the drawings:

Figure 1 is a perspective view of a disk harrow showing my platform mounted thereon, Figure 2 is a top plan view of the platform, Figure 3 is a sectional view therethrough taken substantially on the line 3—3 of Figure 2, Figure 4 is a perspective view showing one of the devices for attaching the platform to the stub tongue, Figure 5 is a perspective view of another device for the same purpose, Figure 6 is a detail sectional view taken substantially on the line 6—6 of Figure 2.

Referring to the drawing in detail it will be seen that the numeral 5 denotes generally an ordinary disk harrow which in the present instance includes weight boxes 6 and a steel stub tongue 7. This disk harrow is also provided with scrapers 8 operated by members 9 having pivoted thereto arms 10 as at 11.

My improved platform structure consists of two right triangular structures S. Each structure S includes an angle iron 10' and an angle iron 11' acutely disposed thereto and riveted or otherwise fixed thereto as at 12 and a plurality of slats 14 disposed between the angle irons 10' and 11'. A U-shaped bracket 16 has a bolt 17 extending through the bight thereof and attached to a clamp plate 18 in order that the brackets may be mounted on the stub tongue structure 7 as is clearly shown in Figure 4. The extremities of the U-shaped bracket 16 are apertured as at 19 in order that a bolt 20 may pass therethrough and through corresponding apertures in the extremities of the angle irons 11. The other ends of the angle irons are connected together by flexible means such as a chain 21. Guide arms 22 are attached to the angle iron and extend downwardly alongside of the tongue structure 7 so as to properly space the rear of the platform. These platforms at their rear rest on the weight boxes 6.

In Figure 5 another embodiment of the bracket structure has been shown consisting of two bars 23 clamped to the tongue 7' by bolts 24 extending through apertures 25 in the bars. The upper extremities of the bars are apertured as at 19'.

On two slats of each platform structure S there are mounted two plates 27 through the center of which is slidable a rod 28 having a footpiece 29 at the upper end thereof and a frame 30 at the lower end thereof. A spring 31 is disposed about the rod 28 impinging against the top plate and the footpiece 29 so as to hold the same normally upwardly. The arm 10 projects through the frame 30 so that by pressing down on the footpiece the arm 10 and the operating member 9 may be actuated to operate the scrapers 8 in the proper usual well known manner.

It is thought that the construction, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A platform attachment of the class described comprising a pair of sections, a bracket structure for attaching the sections to a stub tongue of a harrow, arms on the sections for straddling said stub tongue, and flexible means connecting the rear ends of the platform sections.

2. A platform attachment of the class described comprising a pair of sections, a bracket structure for attaching the sections to a stub tongue of a harrow, arms on the sections for straddling said stub tongue, flexible means connecting the rear ends of the platform sections, scrapers and operating means therefor, means on the platform sections for actuating the operating mechanism of the scrapers of the harrow.

3. In combination, a wheeled harrow including a stub tongue, a plurality of scrapers, actuating means for said scrapers; and a pair of platform sections, a bracket structure on the stub tongue, means engaging the platform sections with the bracket structure, a chain connecting the rear of the platform sections, a pair of rods, means for slidably mounting the rods on the platform sections, footpieces on the rods, springs normally holding the rods upwardly, and means for engaging the rods with the actuating means.

In testimony whereof I affix my signature.

HARRY ZEILENGA.